United States Patent
Drumm (10) Patent No.: US 11,760,331 B2
(45) Date of Patent: Sep. 19, 2023

(54) ELECTROMECHANICAL-HYDRAULIC PISTON ACTUATOR AND BRAKE SYSTEM

(71) Applicant: Continental Teves AG & Co. oHG, Frankfurt am Main (DE)

(72) Inventor: Stefan Drumm, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 0 days.

(21) Appl. No.: 17/269,713

(22) PCT Filed: Aug. 13, 2019

(86) PCT No.: PCT/EP2019/071636
§ 371 (c)(1),
(2) Date: Feb. 19, 2021

(87) PCT Pub. No.: WO2020/038759
PCT Pub. Date: Feb. 27, 2020

(65) Prior Publication Data
US 2021/0197784 A1 Jul. 1, 2021

(30) Foreign Application Priority Data
Aug. 22, 2018 (DE) ...................... 10 2018 214 188.6

(51) Int. Cl.
*F16H 25/20* (2006.01)
*B60T 13/74* (2006.01)

(52) U.S. Cl.
CPC ........ *B60T 13/745* (2013.01); *F16H 25/2015* (2013.01); *F16H 25/2025* (2013.01);
(Continued)

(58) Field of Classification Search
CPC ............. F16H 25/2025; F16H 25/2003; F16H 2025/204; F16H 2025/2071;
(Continued)

(56) References Cited

U.S. PATENT DOCUMENTS

| 93,969 A | * | 8/1869 | Corbett | ................ A61B 6/4405 192/95 |
| 2,476,375 A | * | 7/1949 | Kent | ....................... A61F 5/453 D24/118 |

(Continued)

FOREIGN PATENT DOCUMENTS

| CN | 103635367 A | 3/2014 |
| DE | 102009019299 A1 | 11/2010 |

(Continued)

OTHER PUBLICATIONS

German Search Report for German Application No. 10 2018 214 188.6, dated Sep. 6, 2019, with partial English translation, 8 pages.
(Continued)

Primary Examiner — Gregory Robert Weber
(74) Attorney, Agent, or Firm — RatnerPrestia (57) ABSTRACT

An electromechanical-hydraulic piston actuator providing pressurized pressure medium for a brake system of a vehicle, including an electric motor having a stator and a rotor, a rotation-translation mechanism driven by the electric motor and which has a rotatable threaded nut and a threaded spindle prevented from rotating and displaceable in its axial direction, a piston coupled with the threaded spindle in the axial direction thereof, a hydraulic cylinder having a hydraulic chamber filled with pressure medium into which the piston is displaceable from a rear piston position towards a forward piston position to pressurize the pressure medium and/or expel it from the chamber. A hydraulic connection is connected to the chamber via which pressure medium can be expelled from the chamber. An isolation device is provided (Continued)

for the piston-travel-controlled isolation of the rotational coupling between the rotor of the electric motor and the threaded nut.

16 Claims, 5 Drawing Sheets

(52) U.S. Cl.
CPC ............... *F16H 2025/204* (2013.01); *F16H 2025/2031* (2013.01); *F16H 2025/2037* (2013.01); *F16H 2025/2046* (2013.01); *F16H 2025/2081* (2013.01)

(58) Field of Classification Search
CPC ......... F16H 25/2015; F16H 2025/2031; F16H 2025/2037; B60T 13/745
See application file for complete search history.

(56) References Cited

U.S. PATENT DOCUMENTS

| | | | | |
|---|---|---|---|---|
| 2,701,478 | A | * | 2/1955 | Riess ..................... F16H 35/10 74/411 |
| 4,920,816 | A | * | 5/1990 | Inabe ................. F16H 25/2025 192/93 C |
| 9,982,662 | B2 | * | 5/2018 | Weh ...................... B60T 8/4018 |
| 10,211,608 | B2 | * | 2/2019 | Weeks ................. H02B 11/167 |
| 10,259,440 | B2 | | 4/2019 | Gilles |
| 10,486,657 | B2 | * | 11/2019 | Ko .......................... F04B 17/03 |
| 10,696,283 | B2 | * | 6/2020 | Nagel ..................... B60T 11/18 |
| 2007/0145806 | A1 | * | 6/2007 | Wilder ............... B64D 11/0641 297/423.32 |
| 2010/0206114 | A1 | * | 8/2010 | Koyagi ............... F16C 29/0685 74/424.82 |
| 2015/0377261 | A1 | | 12/2015 | Weh et al. |
| 2016/0251007 | A1 | | 9/2016 | Ko et al. |
| 2018/0001880 | A1 | * | 1/2018 | Huang .................... B60T 13/66 |
| 2018/0251115 | A1 | | 9/2018 | Nagel et al. |
| 2019/0152462 | A1 | * | 5/2019 | Panunzio ................ B60T 11/18 |
| 2019/0242171 | A1 | * | 8/2019 | Wittelsbuerger ....... F16D 65/18 |

FOREIGN PATENT DOCUMENTS

| | | | |
|---|---|---|---|
| DE | 102011108977 A1 | * 2/2012 | ............ B60N 2/366 |
| DE | 202013104855 U1 | 11/2013 | |
| DE | 102016202995 A1 | 9/2016 | |
| DE | 102015213710 A1 | 1/2017 | |
| WO | 2015057111 A1 | 4/2015 | |
| WO | 2017042546 A1 | 3/2017 | |
| WO | 2017093041 A1 | 6/2017 | |

OTHER PUBLICATIONS

International Search Report and Written Opinion for International Application No. PCT/EP2019/071636, dated Nov. 22, 2019, with partial English translation, 7 pages.
International Search Report and Written Opinion for International Application No. PCT/EP2019/071636, dated Nov. 22, 2019, 12 pages (German).
Chinese Office Action for Chinese Application No. 201980054711.8, dated Sep. 5, 2022 with translation, 12 pages.
Korean Office Action for Korean Application No. 10-2021-7004082, dated Jul. 8, 2022 with translation, 20 pages.
Korean Written Decision on Registration for Korean Application No. 10-2021-7004082, dated Mar. 27, 2023 with translation, 4 pages.

* cited by examiner

ELECTROMECHANICAL-HYDRAULIC PISTON ACTUATOR AND BRAKE SYSTEM

CROSS REFERENCE TO RELATED APPLICATIONS

This application is the U.S. National Phase Application of PCT International Application No. PCT/EP2019/071636, filed Aug. 13, 2019, which claims priority to German Patent Application No. 10 2018 214 188.6, filed Aug. 22, 2018, the contents of such applications being incorporated by reference herein.

FIELD OF THE INVENTION

The invention relates to an electromechanical-hydraulic piston actuator for providing pressurized pressure medium for a brake system of a vehicle, comprising
an electric motor having a stator and a rotor,
a rotation-translation mechanism which is driven in rotation by the electric motor and which has a rotatable threaded nut and a threaded spindle which is prevented from rotating and is mounted so as to be displaceable in its axial direction,
a piston coupled with the threaded spindle in the axial direction thereof,
a hydraulic cylinder having a hydraulic chamber which is filled with pressure medium and into which the piston is displaceable by translational movement of the spindle from a rear piston position in the direction towards a forward piston position in order to pressurize the pressure medium and/or expel it from the chamber,
a hydraulic connection which is connected to the chamber and via which pressure medium can be expelled from the chamber, and
a supporting structure to which the electric motor, the rotation-translation mechanism and the hydraulic cylinder are fastened.

It relates further to a brake system with electronically controllable, central electro-hydraulic brake pressure supply and hydraulically actuatable wheel brakes.

BACKGROUND OF THE INVENTION

Modern brake systems use electronic control and regulating devices and control multiple operating modes. In a regular operating mode, that is to say an operating mode provided for the normal driving mode, the individual braking torques acting at the vehicle wheels are provided in an electronically regulated manner. "By-wire" technology can be used for this purpose. This is understood as meaning that at least a portion of a functional chain from a vehicle deceleration request to the physical build-up of wheel brake torques is in the form of an electrical or electronic transmission path. Such a deceleration request can come from a human driver but also from a technical system, such as a driver assist system—for example for automatically avoiding situations that are critical in terms of driving dynamics or for preventing the vehicle from rolling back when starting on a hill—and, in a vehicle with an automated driving function, also from a so-called virtual driver, that is to say a computer system which takes on the task of driving.

The human being as driver communicates their request for deceleration by actuation of the brake pedal, the electronic systems communicate said request via cybernetic signals. In a by-wire brake system, actuation of the brake pedal is first also converted into a corresponding signal. Such consequent use of by-wire technology offers the advantage that, on the one hand, the mentioned different deceleration requests can be superposed by means of combinations of signals without feedback and, on the other hand, different forms of wheel brake torque generation can be chosen without any undesirable feedback on the brake pedal. This is necessary in order, in electric and hybrid vehicles, to carry out braking preferably as so-called regenerative braking, in which the requested vehicle deceleration is effected partially or completely via an electric traction motor operating in generator mode. In the case of partially regenerative braking, the purpose of the friction brake is to contribute the remaining portion of the vehicle deceleration.

By-wire technology requires a functioning electrical power supply for the brake system. In order to obtain a pedal-controlled braking action even when the electrical power supply has failed, the by-wire system can be constructed in such a manner that it automatically "falls back" into a back-up operating mode in that operating situation. For the possible case of a non-operational electronic control and regulating device unit—for example in the event of failure of the vehicle electrical system—it is provided that the braking function is controlled solely via actuation of the brake pedal, and for that purpose the brake pedal is operatively connected directly to the wheel brakes via a mechanical-hydraulic coupling. Such an operation of the brake system in its back-up operating mode functions without the assistance of an electronic control and regulating device and is therefore used as a fallback level for the possible case of a non-operational electronic control and regulating device unit.

In order, in a by-wire brake system which comprises a brake pedal and works by-wire in normal operation, to obtain a force-travel characteristic of the brake pedal that is comfortable for the driver, a so-called pedal travel simulator is used, that is to say a technical device which, for each brake pedal actuating force value, generates an associated brake pedal travel in a predefined manner. In the simplest case, the simulator is a pedal return spring. If, in the case of a spontaneous utilization of the fallback level during normal operation, the actuating energy deposited in the simulator by the driver by means of their muscle work in by-wire operating mode is now to be used for brake actuation in the back-up operating mode, a more complex pedal travel simulation device can be used. In vehicles which are moved solely in a fully automated manner, the brake pedal can optionally be omitted—however, there is then also no back-up operating mode with direct, non-electronic feedthrough.

In order to generate wheel brake torques, the friction brakes can be actuated. Actuating energy is required for that purpose. In back-up operating mode, the driver applies this actuating energy by means of their muscle work. In the normally used by-wire operating mode, this is undertaken by an actuator which is controlled by the electronic control and regulating unit and which, in the case of hydraulic wheel brakes, is in the form of a pressure actuator. One actuator can thereby be used for each wheel brake. Preferably, however, multiple wheel brakes are activated by means of a common pressure actuator and, in the event that different pressures are required in the wheel brakes connected thereto, solenoid valves controlled by the electronic control and regulating unit are provided. During operation, the actuator provides a pressure whose value corresponds at least to the maximum pressure required in the connected wheel brakes and, by means of the solenoid valves, the individual wheel brake pressures are individually derived therefrom if required.

Since solenoid valves require substantially less installation space than additional actuators, a pressure actuator having four channels, for example, for a vehicle with four wheels is in its most compact form preferably constructed with an electrohydraulic actuator and a downstream four-channel modulator with in each case an inlet and an outlet valve. Where there are special requirements—for example to carry out braking preferably as regenerative braking at one vehicle axle and as friction braking at the other vehicle axle—it can be expedient to use two electrohydraulic actuators associated with the two vehicle axles.

In electrohydraulic brake systems with the "brake-by-wire" operating mode, the driver is decoupled from direct access to the brakes in this operating mode. When the pedal is actuated, a pedal-decoupling unit and a simulator are usually actuated, the driver's braking intention being detected by a sensor system. The pedal simulator is used to give the driver a brake pedal feel which is as familiar as possible. The detected braking intention leads to the determination of a nominal vehicle deceleration value, from which the nominal brake pressure for the brakes is then determined. The brake pressure is then built up actively in the brakes by a pressure supply device.

The actual braking is thus achieved by software-controlled pressure build-up in the brake circuits by means of a pressure supply device, which is activated by a control and regulating unit. There can be used as the pressure supply device in the above-described brake systems in particular an electromechanical-hydraulic linear actuator in which, for building up pressure, a piston is displaced axially into a hydraulic pressure chamber. The rotation of the motor shaft of an electric motor is converted by a rotation-translation mechanism into an axial displacement of the piston.

The setting of a required system pressure is carried out by means of a suitable pressure regulator, or a suitable pressure regulating system, in which, for example, further regulators for the speed and rotation angle of the electric motor are subordinate to the pressure regulator.

The intended range of linear movement of the piston of such an electromechanical-hydraulic linear actuator is limited by the bore length of the hydraulic cylinder. In order to prevent the possibility of the piston being pulled out of the hydraulic cylinder by the drive, a mechanical stop is provided between the piston or the spindle connected to the piston and the supporting structure. A rear end position of the actuator piston is defined by contact of the piston or spindle with that stop.

It is known that, in the case of such linear actuators, which in particular can be in the form of electromechanical-hydraulic piston actuators, there is the risk of self-destruction if, on retraction, the rear stop (situated in the opposite direction to the direction of pressure build-up) is struck at high speed. This is prevented during active operation by a motor controller, which brakes the electric motor as the rear stop is approached. However, it is conceivable that the motor control unit fails suddenly during rapid retraction, for example as a result of a failure of the electrical power supply. Owing to the inertia mass of the electric motor, the electric motor retains its speed, and the rear stop is in this case struck virtually without braking.

DE 10 2009 019 209 A1. Incorporated herein by reference, describes a linear actuator having a rotation-translation mechanism having a threaded spindle and a threaded nut. The threaded nut is non-rotatably mounted in a supporting structure. The spindle is driven by an electric motor, the rotor of which is coupled with the threaded spindle via a torque transmission coupling. Even before the end position is reached, a coupling disk of the torque transmission coupling is brought out of engagement, so that the torque transmission coupling uncouples shortly before the end position.

The described linear actuator has the disadvantage that coupling is possible only when the rotation angles of the coupling disk and the electric motor correspond, so that the coupling disk is able to "thread" itself into a groove of the rotor of the electric motor. It is therefore uncertain whether secure re-coupling will take place after uncoupling has taken place.

SUMMARY OF THE INVENTION

Accordingly, an aspect of the invention is an improved linear actuator in the form of an electromechanical-hydraulic piston actuator in such a manner that uncoupling in the end position is made possible in order to prevent damage as a result of impact of a threaded spindle and, when operation is resumed, coupling is made possible again reliably and independently of the rotation angle. Furthermore, a brake system having an improved linear actuator is to be provided.

In relation to the electromechanical-hydraulic piston actuator, this object is achieved according to an aspect of the invention in that there is provided an isolation device for the piston-travel-controlled isolation of the rotational coupling between the rotor of the electric motor and the threaded nut.

The dependent claims and the description relate to advantageous embodiments of the invention.

An aspect of the invention starts from the observation that, in order to prevent possible destruction of the actuator in the event of an electrical malfunction during rapid retraction, it is necessary by non-electrical means to prevent the end position from being reached in an unbraked manner coupled with the inertia mass of the electric motor. Such an electrical malfunction can be caused, for example, by a temporary disruption of the electrical power supply in the vehicle. It is also important that the subsequent re-coupling takes place reliably, so that the functionality of the actuator is restored as soon as the electrical malfunction has been corrected.

As has now been recognized, this can be achieved in that, as the rear stop is approached, an automatic, purely mechanically controlled decoupling of the translational movement of the actuator or actuator piston from the rotating inertia mass movement of the electric motor takes place.

Advantageously, the isolation of the rotational coupling can be activated by an approach to a rear piston position, that is to say the actuator is configured in such a manner that, as the rear piston position is approached, mechanical means isolate the mechanical coupling between the rotor, which is subject to the inertia mass, of the electric motor and the piston.

For this purpose, the isolation device preferably comprises a separable positive connection between a drive element, which is rotationally coupled with the rotor of the electric motor, and the threaded nut.

The separable positive connection is advantageously formed by a tooth system.

Separation advantageously takes place by disengagement of the threaded nut from the positive connection in the axial actuation direction.

Advantageously, the tooth system is formed on the basis of a conical base area. As a result, the disengaged parts center themselves relative to one another when the coupling is closed again. In a first preferred embodiment, the threaded nut can comprise the cone inner surface, while the drive element comprises the cone outer surface. In a second preferred embodiment, the threaded nut comprises the cone outer surface, while the drive element comprises the cone inner surface.

In a preferred embodiment there is present a stop which limits the travel of the piston in the direction towards the rear piston position.

Advantageously, activation of the isolation takes place in that, on retraction of the piston, the piston is prevented from moving further by means of the stop, whereby, on further rotation of the threaded nut, the threaded nut is isolated from the drive element.

For this purpose, a spring is preferably provided between the drive element and the threaded nut, the spring force of which spring acts against the isolation of the threaded nut from the drive element. The term spring here generally includes elastic elements whose elastic deformation substantially follows Hooke's law, or the spring law.

The spring is preferably supported in a first support region on the threaded nut and in a second support region on the drive element.

The spindle nut is thereby coupled with the drive wheel preferably via a conical tooth system, in such a manner that the spindle nut separates from the drive wheel under a high tensile load. The preload of the spring defines the force at which this takes place. On re-coupling, the nut centers itself in a secure manner in the wheel by virtue of the conical tooth system and the support by the spring force.

The drive element preferably has a first conical surface, in particular an inner surface, having a first tooth system, wherein the threaded nut comprises a second conical surface, in particular an outer surface, having a second tooth system, and wherein the first tooth system is in engagement with the second tooth system in a coupled state, and wherein, as a result of a rear end position of the rotation-translation mechanism being approached by the electric motor, the first tooth system and the second tooth system are brought out of engagement.

The spring, as a result of a preload, thereby advantageously exerts a force on the threaded nut along the axis of the threaded nut, in such a manner that the first conical surface is pressed against the second conical surface.

Advantageously, the spindle connected to the piston is axially displaceably and non-rotatably mounted in the supporting structure. There are multiple possibilities for producing a corresponding mechanical rotation prevention device, which are described hereinbelow:

In a first variant, the rotation prevention device comprises a groove formed externally on the spindle in the longitudinal direction, into which groove there engages a rotation prevention element which is fastened to the supporting structure or integrated therein and which is in the form of a pin or web. The axial groove advantageously passes through the turns of the spindle.

In a second variant, the rotation prevention device comprises a groove formed in the longitudinal direction in the cylindrical wall of a bore inside the spindle or the piston connected to the spindle. This axial groove can be formed on the chamber side or on the drive side in the wall of an inner bore of the spindle or of the piston connected to the spindle.

In a third variant, the rotation prevention device of the spindle advantageously comprises an arm which is supported on the supporting structure in such a manner that rotation of the spindle about its axis is prevented and displacement of the spindle in the axial direction is permitted. As a particularly advantageous alternative to a groove in the supporting structure, it is here possible that the arm is supported in the circumferential direction on a bolt which is fastened to the supporting structure and arranged axially parallel and offset with respect to the spindle axis.

In a preferred embodiment, at least two bolts in the form of tension rods are provided. As parts that transmit the actuator return force, these tension rod bolts are important parts of the supporting structure. The frictional contact path within the electromechanical-hydraulic piston actuator runs via the drive element, positive connection, threaded nut, spindle, piston, pressure medium column, chamber bottom, chamber wall, tension rod and bearing. The main loading direction of the bearing is axial. At least one tension rod bolt has the dual function of transmitting tensile force and guiding the rotation prevention device arm.

In a preferred embodiment, a stop is formed in the supporting structure of the electromechanical-hydraulic piston actuator, which stop, as the rear end position is approached, blocks a further translational movement of the threaded spindle-piston assembly. A rotational drive of the spindle nut having rotation angle values which correspond to a translation of the threaded spindle into the region blocked by the stop has the result that the spindle, by virtue of being supported on the mechanical stop, exerts a force on the spindle nut which pulls the nut away from the drive element in the actuation direction. By disengagement of the conical tooth system provided for this purpose between the drive element and the spindle nut, the rotational coupling between the electric motor and the spindle nut is isolated, so that, in this operating state, further movement of the electric motor in the release direction has no effect and therefore no damage can occur.

The drive element is preferably in the form of a drive wheel which is rotatably and axially fixedly mounted in the supporting structure and which is driven by the electric motor by means of a rotation-rotation coupling or a rotation-rotation mechanism, wherein the speed of the drive wheel is lower than the speed of the rotor of the electric motor.

The rotation-translation mechanism formed by the threaded spindle, the threaded nut and the rotation prevention device is preferably in the form of a steep lead screw drive. That is to say, in order to achieve high efficiency, a thread pitch of more than 10 degrees and a multiple thread is used. A material pairing with a spindle made of metal, for example stainless steel, and a spindle nut made of plastics material is particularly advantageous with regard to very quiet running of the rotation-translation mechanism.

In relation to the brake system, the above-mentioned advantage is achieved according to an aspect of the invention in that there is provided an above-described actuator which, for active pressure build-up, is hydraulically separably connected to wheel brakes of the brake system.

The advantages of an aspect of the invention are in particular that
automatic mechanical protection of the linear actuator against self-destruction in the case of retraction at high speed against the rear stop is provided.
In addition, an aspect of the invention makes possible a particularly compact construction of the linear actuator with a minimal number of structural elements.

BRIEF DESCRIPTION OF THE DRAWINGS

One exemplary embodiment of the invention will be described in greater detail with reference to a drawing, in which, in a highly schematic view.

Identical parts are denoted by the same reference designations in all of the figures.

DETAILED DESCRIPTION OF THE PREFERRED EMBODIMENTS

Figure 1:
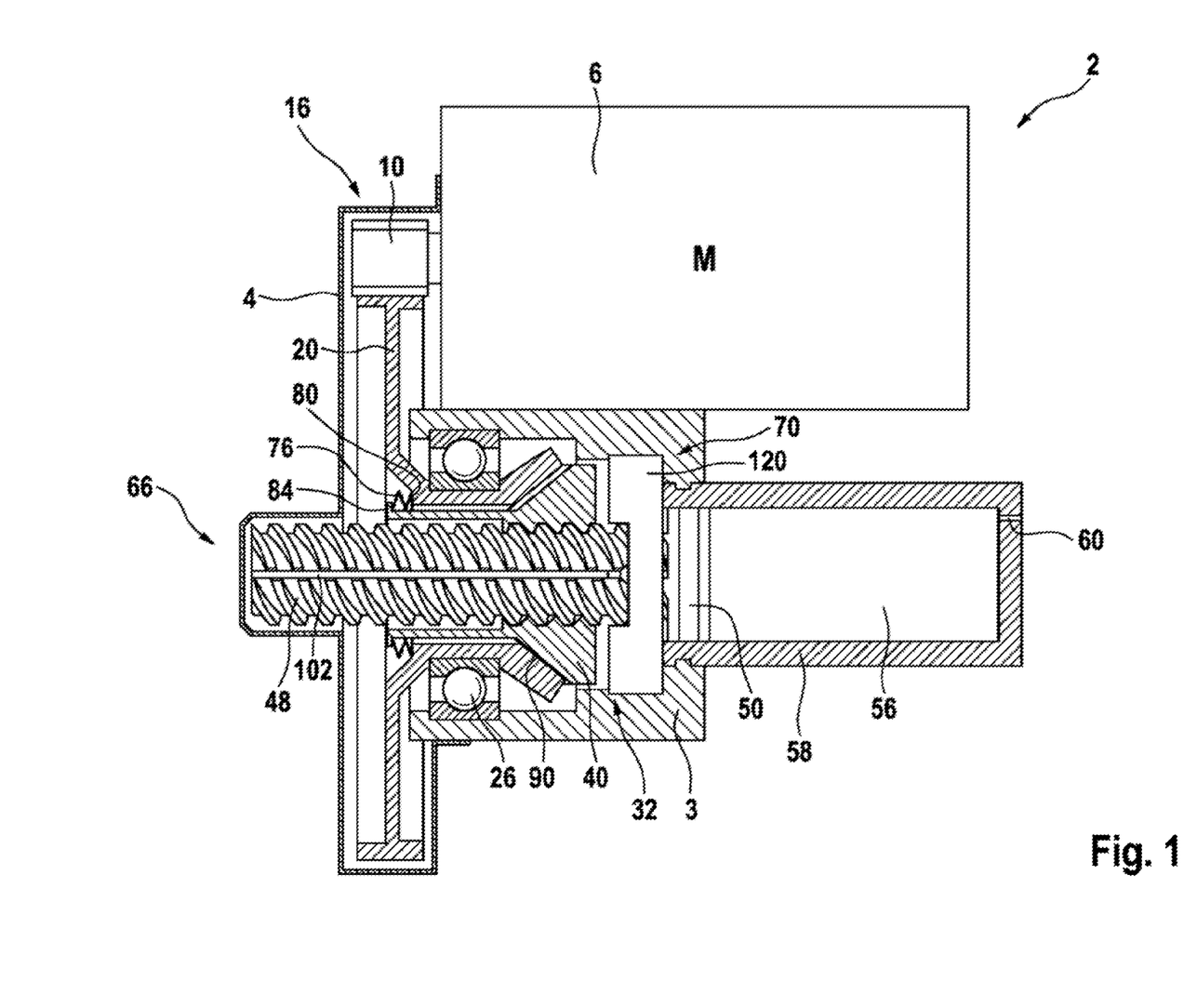
FIG. 1 shows an electromechanical-hydraulic piston actuator.

An electromechanical-hydraulic piston actuator 2 shown in FIG. 1 comprises a housing having a supporting structure 3, a transmission cover 4 and an electric motor 6 having a stator and a rotor 10, which is coupled with a drive element 20 via a rotation-rotation mechanism 16—which is shown as a gear wheel pairing in FIG. 1 but can likewise readily be represented by a belt transmission. When the rotor 10 rotates, the drive element 20, which is rotatably mounted in the supporting structure 3 in a bearing 26, is set in rotation. The actuator 2 has a rotation-translation mechanism 32 which is driven by the drive element 20 and which comprises a rotatable threaded nut 40 and a threaded spindle 48 which is prevented from rotating and is mounted so as to be displaceable in its axial direction. A piston 50 is coupled in the axial direction with the threaded spindle 48.

For building up pressure, the piston 50 is displaceable in a hydraulic cylinder 58 which is connected to the supporting structure 3 and comprises a hydraulic chamber 56 which is filled or can be filled with pressure medium. For this purpose, the piston 50 is displaced, by translational movement of the threaded spindle 48, from a rear piston position shown in the drawing in the direction towards a forward piston position, whereby the pressure medium in the chamber 56 is pressurized or expelled from the chamber. The chamber 56 is connected to a hydraulic connection 60, through which pressure medium can be expelled from the chamber 56. The connection 60 can be connected, for example, to one or two hydraulic brake circuits so that, under the control of electronic activation of the electric motor, pressure can be built up in at least one brake circuit by means of the actuator 2.

The actuator 2 is adapted, in the operating situation of an impact of the spindle 48 as a rear stop 66 is approached at speed, to prevent the actuator 2 from being damaged or even destroyed by the action of the inertia mass of the electric motor. For this purpose there is provided a purely mechanical isolation device 70, that is to say which is not dependent on the functioning of electrical components, for isolating, in dependence on the operating situation, the transmission coupling between the rotation of the rotor of the electric motor and the linear movement of the spindle, which isolation device comprises the nut 40, the drive element 20 and a spring 76. The spring 76 is supported in a first support region 80 on the threaded nut 40 and in a second support region 84 on the drive element 20.

The threaded nut 48 and the drive element 20, which here is in the form of a drive wheel, are coupled by means of a conical tooth system 90 in such a manner that the spindle nut 48 separates from the drive wheel under a high tensile load, that is to say exceeding the force of the spring 76. In normal operation of the actuator 2, in which the spindle 48 does not strike the rear stop 66, the spring 76 has a preload, which defines the force at which this separation, or uncoupling, takes place.

Figure 2:
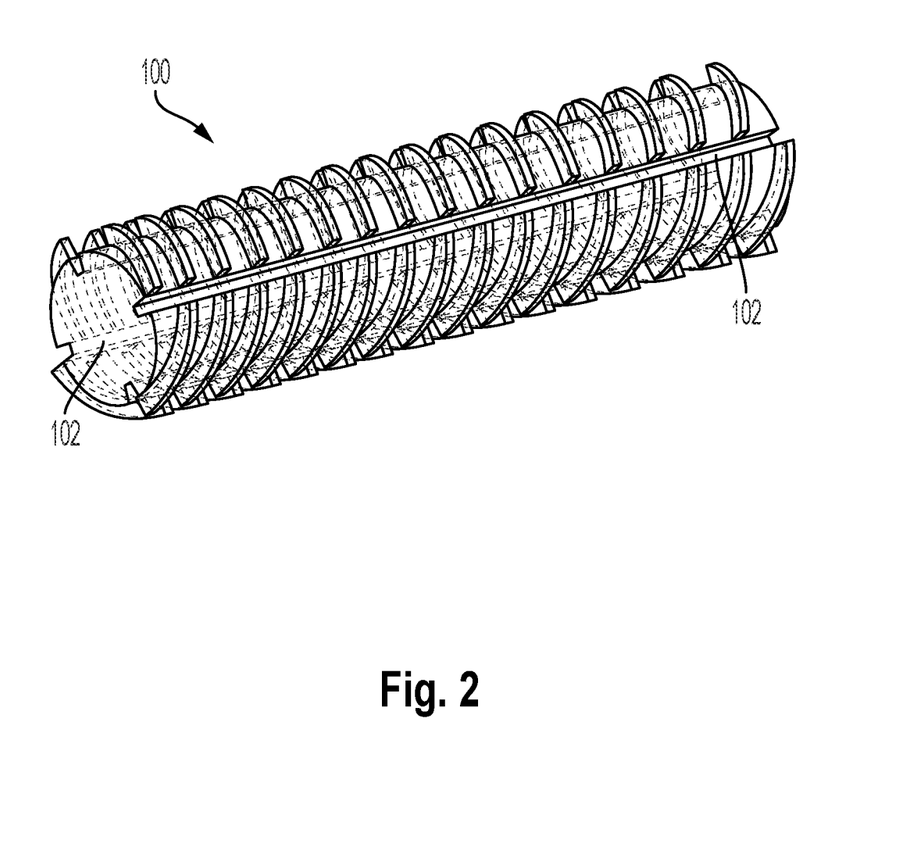
FIG. 2 shows a wire frame model of a quadruple-grooved steep-threaded spindle.

The threaded spindle 48 is in the form of a longitudinally grooved steep-threaded spindle 100, as is shown in a preferred embodiment in FIG. 2. This is in the form of a steep-threaded spindle which is provided with at least two longitudinal grooves 102, which are used for preventing the spindle 100 from rotating. A single longitudinal groove appears to be unsuitable since torque support can then only take place by means of additional contact forces acting between the spindle 48 and the nut 40, which would lead to undesirable friction.

In order to provide a rotation prevention device for the spindle 48 there is provided a combined stop and rotation prevention element 120, which is connected to the supporting structure 3 non-displaceably and non-rotatably, or in such a manner that it is prevented from rotating, and which has projections or protrusions which engage into the longitudinal grooves 102. In this manner, rotation of the threaded spindle 48 is prevented.

However, the simple and compact construction, as shown in FIG. 1, of a linear actuator 2 requires the use not of a ball screw drive (KGT) but of a motion or steep lead screw drive. Balls would become stuck in the longitudinal grooves. Compared to a KGT, a steep lead screw drive consists of fewer components and is substantially less expensive but, because of its higher thread pitch, requires a greater rot-rot reduction of the reduction gear. The one-stage spur-gear system shown is therefore to be understood as being symbolic or by way of example. A two-stage spur-gear system, a planetary gear system and/or a belt drive could also be used.

Figure 3:
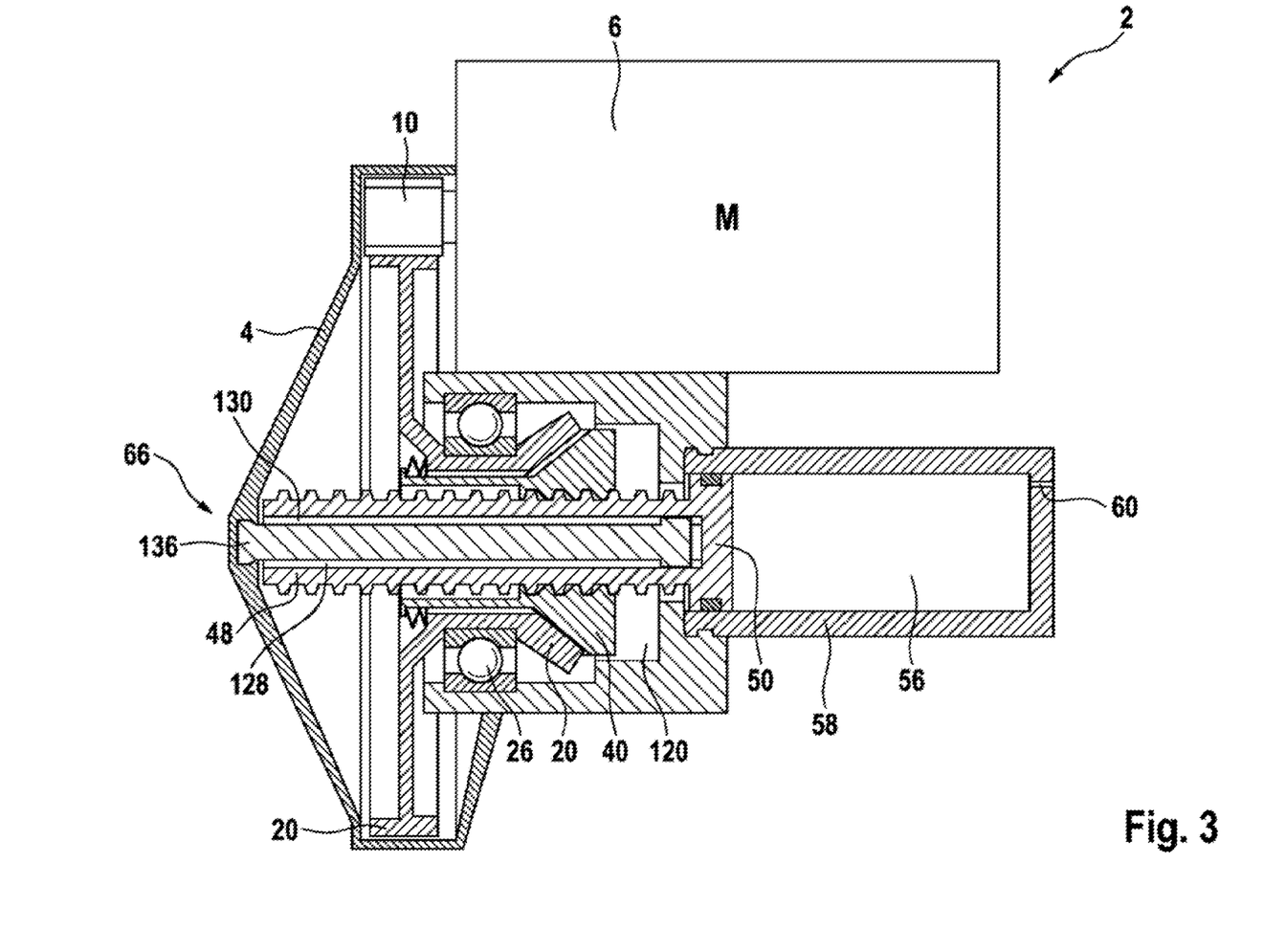
FIG. 3 shows a linear actuator with a rotation prevention device via a spindle inner profile with torque support on the spindle side.

A linear actuator 2 in a second preferred embodiment is illustrated in FIG. 3. In this embodiment, the threaded spindle 48 is hollow. It has a blind hole 128 and, in the blind hole, an inner profile 130, which preferably comprises grooves. A fixing element 136, in particular a rod, is rotatably fastened to the housing at the rear stop 66. The rod is arranged in the cavity 128 of the spindle 48. It comprises protrusions, or projections, which engage into the grooves, whereby rotation of the spindle 48 is prevented. Torque support takes place in this embodiment by fastening the rod, in such a manner that it is prevented from rotating, in a reinforced transmission cover 4 of the housing, which transmission cover is in turn supported on the supporting structure 3.

Figure 4:
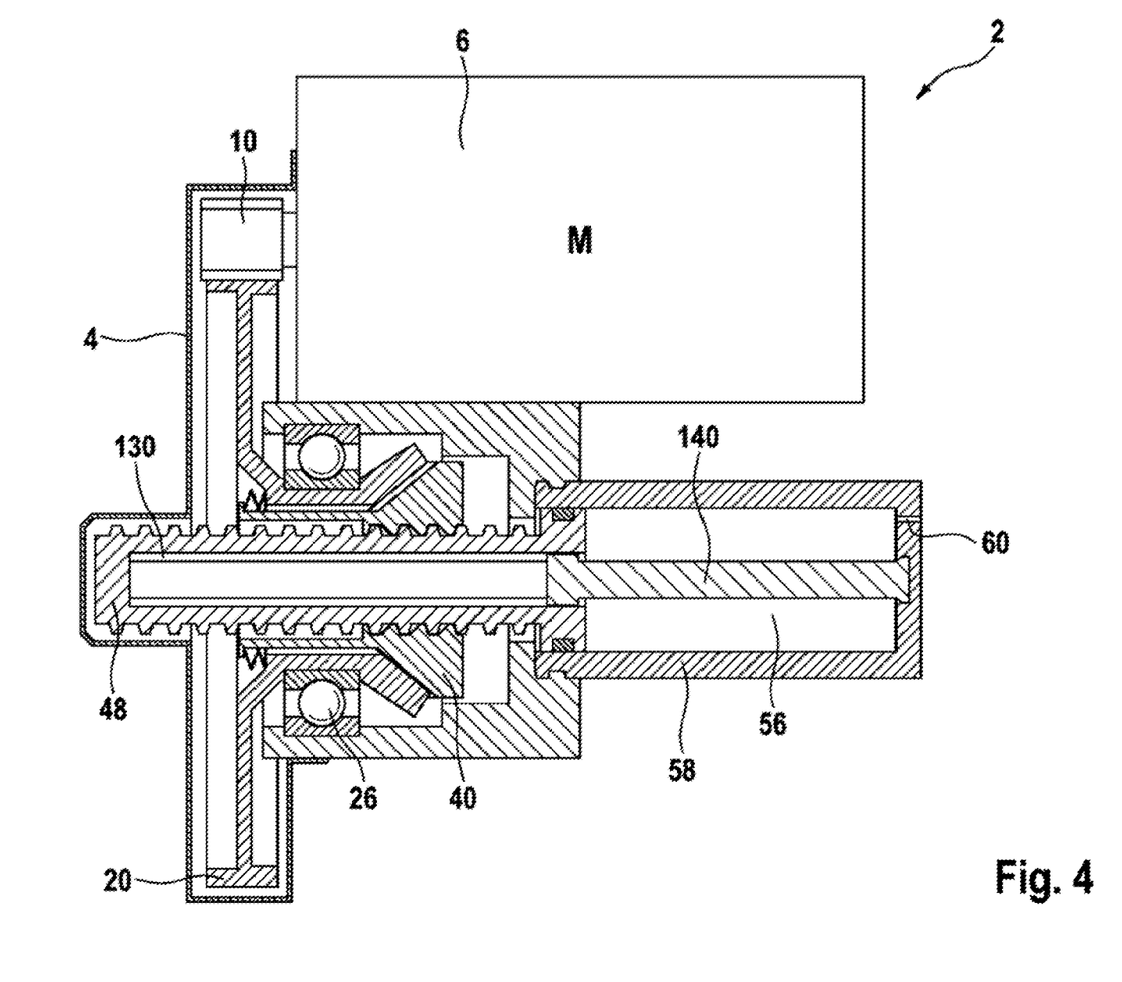
FIG. 4 shows a linear actuator with a rotation prevention device via a spindle inner profile with torque support on the piston side.

A further preferred embodiment of a linear actuator 2 is illustrated in FIG. 4. In this embodiment too, the threaded spindle 48 is hollow and in the form of a blind hole. It has an inner profile 130 which in particular comprises grooves and is open towards the hydraulic side, that is to say towards the chamber 56. A rod 140, which acts as a fixing element, is fastened in a rotationally fixed manner to an inner side of the hydraulic cylinder 58 and, via the hydraulic cylinder, to the supporting structure 3. The rod comprises protrusions, or projections, which engage into the grooves of the spindle 48 and in that manner prevent the spindle 48 from rotating.

Figure 5:
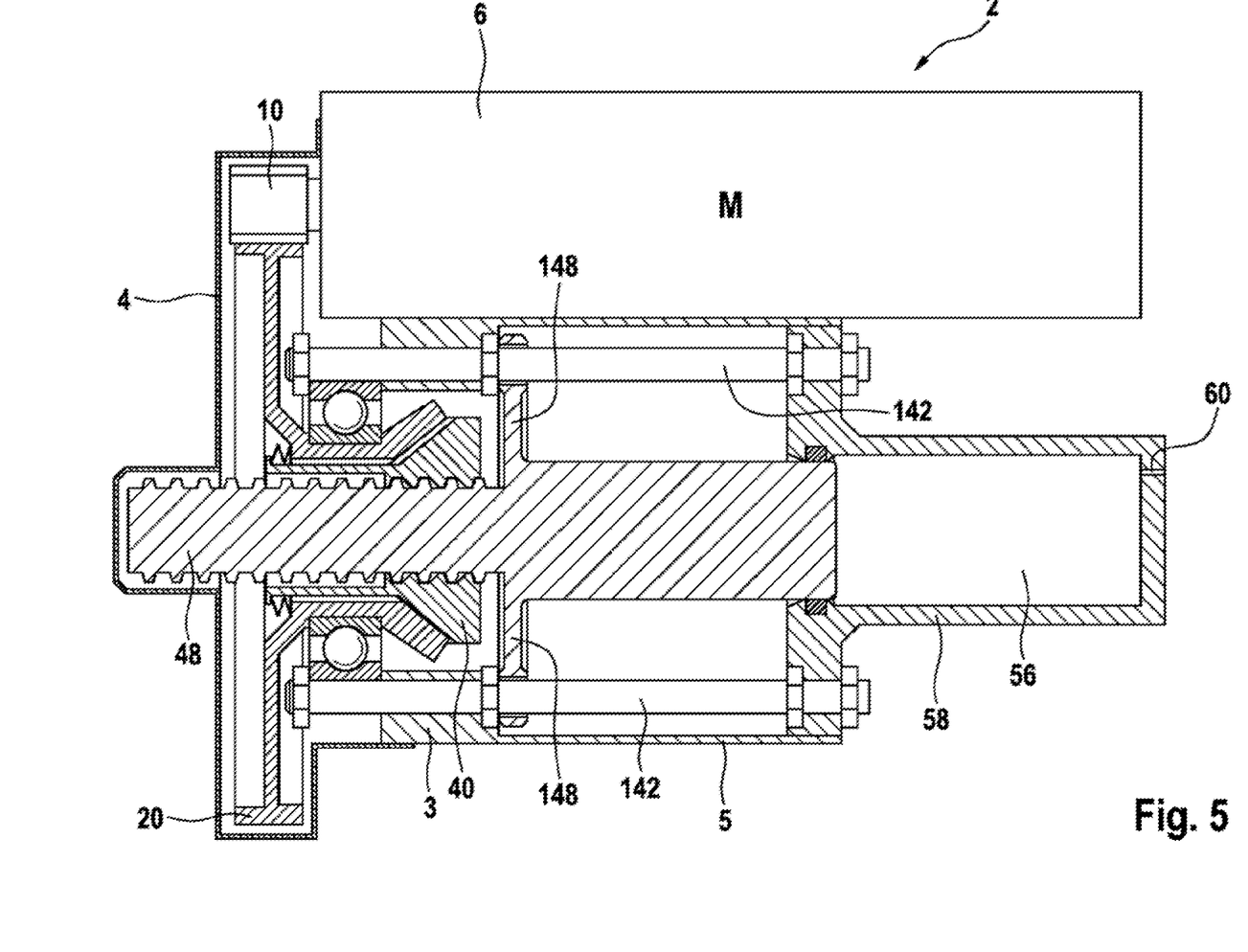
FIG. 5 shows a linear actuator with a rotation prevention device via an arm in conjunction with a tension rod.

A further preferred embodiment of a linear actuator 2 is illustrated in FIG. 5. An assembly of a threaded spindle and a piston having a common axis has at least one arm 148 which is guided in the supporting structure 3 of the actuator in such a manner that rotation of this assembly relative to its axis is prevented and displacement along that axis is made possible. For this purpose, the end of the arm preferably engages around a bolt which is arranged axially parallel to and spaced apart from the threaded spindle-piston axis. A possible alternative would be a groove formed on the inside of the supporting structure 3 and extending axially parallel, in which groove the end of the arm is guided.

It is particularly advantageous if the bolt, in addition to being used for preventing rotation, is used for providing the necessary housing forces. For this purpose there are provided as components of the supporting structure 3 at least two tension rods 142 which provide the actuator chamber holding forces necessary for building up pressure in the actuator chamber. Such a construction is particularly advantageous in view of the production costs, since, apart from the inexpensive tension rods and the hydraulic cylinder 58, no further housing component that transmits high tensile forces is required. The housing of the actuator can therefore be completed in the region of the tension rods 142 by a simple thin-walled casing 5, which can be produced, for example, from sheet metal or plastics material. Despite the slightly increased overall length in this variant, this offers a weight and cost saving because tension rods 142 and a thin-walled casing 5 represent the more advantageous structural solution compared to the alternative of a thick-walled housing portion cast from metal, for example, and designed for the transmission of tensile forces. A further advantage is that, as illustrated, a rod piston can be used. It is more advantageous to arrange the sliding surface that cooperates with the hydraulic gasket outside on a rod than on the inner wall of a cylinder, and to allow it to cooperate with a hydraulic gasket arranged on the piston. However, it is of course also possible to use a piston-cylinder assembly as illustrated in FIGS. 1, 2, 3 and 4.

The invention claimed is:

1. An electromechanical-hydraulic piston actuator for providing a pressurized pressure medium for a brake system of a vehicle, comprising:
   an electric motor having a stator and a rotor,
   a rotation-translation mechanism which is driven in rotation by the electric motor and which has a rotatable threaded nut and a threaded spindle which is prevented from rotating and is mounted so as to be displaceable in an axial direction in response to rotation of the rotatable threaded nut, the rotatable threaded nut being engaged with and driven by a drive wheel driven by the electric motor,
   a piston coupled with the threaded spindle along the axial direction,
   a hydraulic cylinder having a hydraulic chamber which is filled with the pressure medium and into which the piston is displaceable by translational movement of the threaded spindle from a rear piston position in the axial direction towards a forward piston position in order to pressurize the pressure medium and/or expel it from the hydraulic chamber, a hydraulic connection which is connected to the hydraulic chamber and via which the pressure medium can be expelled from the hydraulic chamber and a supporting structure to which the electric motor, the rotation-translation mechanism and the hydraulic cylinder are fastened, and
   an isolation device for mechanically controlling rotational coupling between the drive wheel and the rotatable threaded nut by applying a spring force to the rotatable threaded nut, the spring force pressing the rotatable threaded nut against the drive wheel, the isolation device engaging the rotatable threaded nut to the drive wheel when the rotatable threaded nut is driven under a load less than or equal to the spring force, and the isolation device disengaging the rotatable threaded nut from the drive wheel when the rotatable threaded nut is driven under a load threshold greater than the spring force, wherein the isolation device comprises a spring arranged between the drive element and the threaded nut, and
   wherein a first end of the spring is mounted to a first support region on the threaded nut and a second end of the spring is mounted to a second support region on the drive element.

2. The actuator as claimed in claim 1, wherein the isolation of the rotational coupling is activated when approaching the rear piston position.

3. The actuator as claimed in claim 2, wherein the isolation device comprises a separable connection between a drive element, which is rotationally coupled with the rotor of the electric motor, and the threaded nut.

4. The actuator as claimed in claim 1, wherein the isolation device comprises a separable connection between a drive element, which is rotationally coupled with the rotor of the electric motor, and the threaded nut.

5. The actuator as claimed in claim 4, wherein the separable connection is formed by a tooth system.

6. The actuator as claimed in claim 5, wherein the tooth system is formed on a conical base area.

7. The actuator as claimed in claim 6, wherein the drive element comprises a first conical surface, in particular an inner surface, having a first tooth system of the tooth system, and wherein the threaded nut comprises a second conical surface, in particular an outer surface, having a second tooth system of the tooth system, and wherein the first tooth system is in engagement with the second tooth system in a coupled state, and wherein, as a result of a rear end position of the rotation-translation mechanism being approached by driving the electric motor, the first tooth system and the second tooth system are brought out of engagement.

8. The actuator as claimed in claim 1, wherein there is present a stop which limits the travel of the piston in the direction towards the rear piston position.

9. The actuator as claimed in claim 8, wherein activation of the isolation takes place in that, on retraction of the piston, the piston is prevented from moving further by means of the stop, whereby, on further rotation of the threaded nut, the threaded nut is isolated from a drive element.

10. The actuator as claimed in claim 9, wherein the spring force of the spring acts against the isolation of the threaded nut from the drive element.

11. The actuator as claimed in claim 1, wherein a rotation prevention device of the threaded spindle comprises an axial groove formed in the threaded spindle.

12. The actuator as claimed in claim 11, wherein the axial groove passes through a thread of the threaded spindle.

13. The actuator as claimed in claim 12, wherein the rotation prevention device of the threaded spindle comprises a plurality of axial grooves formed in the threaded spindle, the plurality of axial grooves being radially offset from each other along the threaded spindle.

14. The actuator as claimed in claim 11, wherein the axial groove is formed on a chamber side or on a drive side in the wall of an inner bore of the threaded spindle.

15. The actuator as claimed in claim 1, wherein the spindle is prevented from rotating by a rotation prevention device comprising at least one arm which is supported in a circumferential direction on a bolt arranged axially parallel to and spaced apart from the piston.

16. The actuator as claimed in claim 15, wherein the bolt, in addition to its function as a support element for preventing rotation, also performs the function of a component that transmits tensile forces, for which purpose it is in the form of a tension rod.

* * * * *